United States Patent
Yang et al.

(10) Patent No.: US 9,356,886 B2
(45) Date of Patent: May 31, 2016

(54) TECHNIQUES FOR SCALABLE AND FOOLPROOF VIRTUAL MACHINE MOVE HANDLING WITH VIRTUAL PORT CHANNELS

(71) Applicant: Cisco Technology, Inc., San Jose, CA (US)

(72) Inventors: Yibin Yang, San Jose, CA (US); Liqin Dong, San Jose, CA (US); Chia Tsai, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 542 days.

(21) Appl. No.: 13/645,770

(22) Filed: Oct. 5, 2012

(65) Prior Publication Data

US 2014/0101302 A1  Apr. 10, 2014

(51) Int. Cl.
  *G06F 15/173* (2006.01)
  *H04L 12/931* (2013.01)
  *H04L 12/751* (2013.01)
  *H04L 12/24* (2006.01)

(52) U.S. Cl.
  CPC ............ *H04L 49/70* (2013.01); *H04L 41/0813* (2013.01); *H04L 45/02* (2013.01)

(58) Field of Classification Search
  None
  See application file for complete search history.

(56) References Cited

U.S. PATENT DOCUMENTS

| 8,204,061 | B1 | 6/2012 | Sane et al. |
| 8,249,069 | B2 | 8/2012 | Raman et al. |
| 2010/0293408 | A1* | 11/2010 | Shannon et al. ................. 714/4 |
| 2011/0238820 | A1* | 9/2011 | Matsuoka ..................... 709/224 |
| 2011/0243136 | A1* | 10/2011 | Raman et al. ................. 370/392 |
| 2011/0310729 | A1* | 12/2011 | Raman ................ G06F 11/2007 370/225 |
| 2012/0002534 | A1* | 1/2012 | Lissianoi ....................... 370/216 |
| 2012/0072909 | A1* | 3/2012 | Malik et al. ....................... 718/1 |
| 2012/0195195 | A1 | 8/2012 | Rai et al. |
| 2013/0266018 | A1* | 10/2013 | Ashida et al. ................. 370/392 |
| 2013/0336317 | A1* | 12/2013 | Mithyantha et al. .......... 370/390 |

* cited by examiner

*Primary Examiner* — Chris Parry
*Assistant Examiner* — Stephen Houlihan
(74) *Attorney, Agent, or Firm* — Edell, Shapiro & Finnan, LLC (57) ABSTRACT

Techniques are provided for managing movements of virtual machines in a network. At a first switch, a virtual machine (VM) is detected. The VM is hosted by a physical server coupled to the first switch. A message is sent to other switches and it indicates that the VM is hosted by the physical server. When the first switch is paired with a second switch as a virtual port channel (vPC) pair, the message includes a switch identifier that identifies the second switch. A receiving switch receives the message from a source switch in the network comprising a route update associated with the VM. A routing table of the receiving switch is evaluated to determine whether the host route is associated with a server facing the physical port. The message is examined to determine it contains the switch identifier.

20 Claims, 5 Drawing Sheets

FIG.1

| VM MOVEMENT ADVERTISEMENT MESSAGE | 210 |
|---|---|
| 212 SOURCE LEAF | |
| 214 VM HOST ROUTE | |
| 216 VPC PEER ID | |

TECHNIQUES FOR SCALABLE AND FOOLPROOF VIRTUAL MACHINE MOVE HANDLING WITH VIRTUAL PORT CHANNELS

TECHNICAL FIELD

The present disclosure relates to managing virtual machine movement in a network environment.

BACKGROUND

Switch devices in a network may be configured to manage network communications of one or more physical servers. The physical servers in the network may host one or more virtual machines, and thus, the switch devices that manage the network communications of the physical servers may also manage communications of the one or more virtual machines. Virtual machines may be reassigned to different physical servers in the network based on network conditions. The switch devices need to be aware of the virtual machine assignment in order to forward communications between virtual machines in the network.

DESCRIPTION OF EXAMPLE EMBODIMENTS

Overview

Techniques are presented herein for managing movements of virtual machines in a network. These techniques may be embodied as a method, apparatus and instructions in a computer-readable storage media to perform the method. At a first switch device in a network, a virtual machine is detected. The virtual machine is hosted by a physical server that is coupled to the first switch device. A message is sent to other switch devices. The message indicates that the virtual machine is hosted by the physical server. When the first switch device is paired with a second switch device as a virtual port channel pair in the network, the message includes a switch identifier that identifies the second switch device.

Additionally, a first switch device receives a message from a second switch device in the network. The message comprises a route update associated with a virtual machine in the network. A routing table of the first switch device is evaluated to determine whether the host route in the route update received from the second switch device is associated with a physical port of the first switch device. The message is examined to determine whether the message contains a switch identifier. The switch identifier may identify the first switch device as part of a virtual port channel pair with the second switch device in the network. The virtual machine is determined not to be associated with the first switch device based on the evaluating and examining.

Example Embodiments

The techniques described hereinafter involve managing virtual machine movements in a network environment. An example network topology (hereinafter "network") is shown at reference numeral 100 in FIG. 1. The network 100 comprises a plurality of switch devices (also referred to hereinafter as "switches"). The switches are shown at reference numerals 102(a)(1)-102(a)(4) and 102(b)(1)-102(b)(4).

Figure 1:
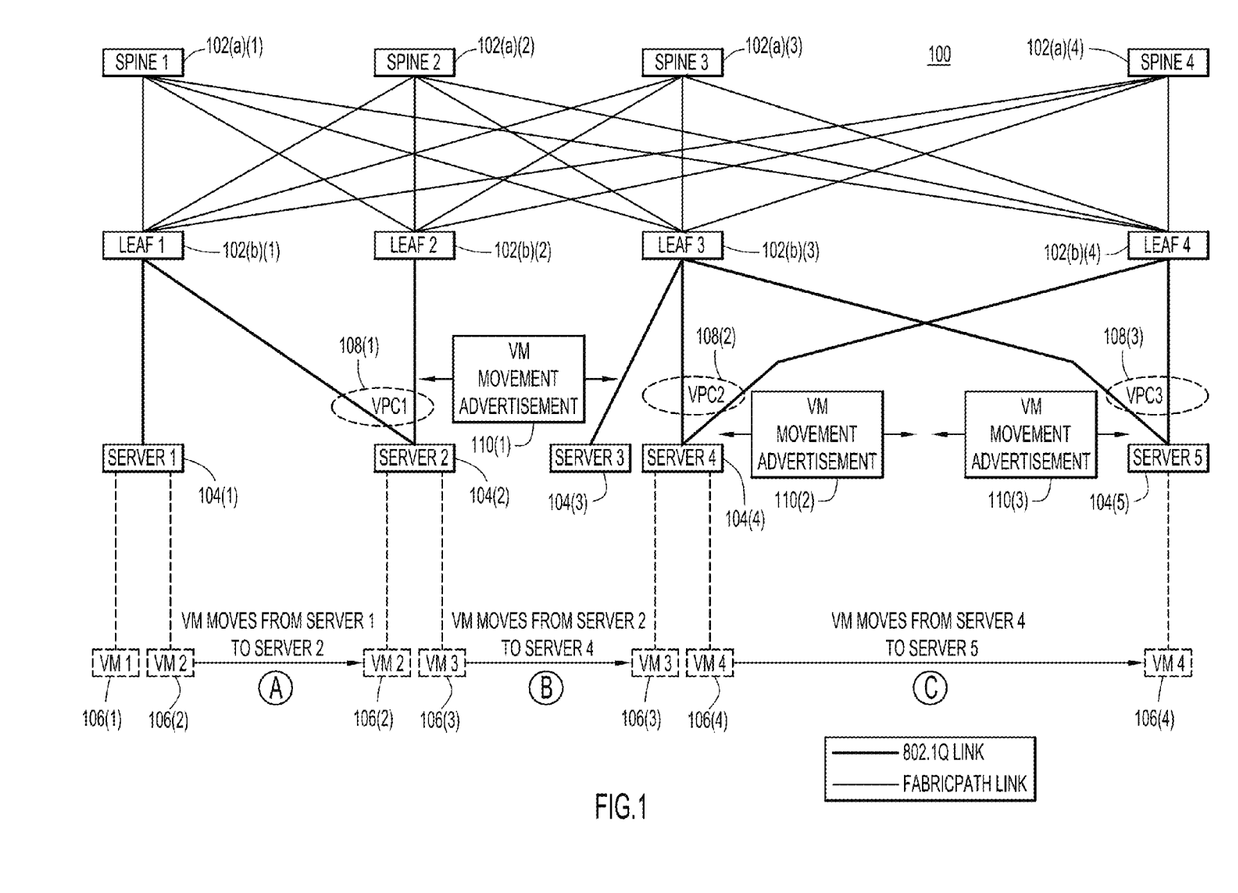
FIG. 1 shows an example network topology including switch devices that are configured to detect movement of virtual machines in the network.

Each of the switches in the network 100 is arranged in a particular configuration based on its connectivity to other devices in the network 100. For example, the switch devices 102(a)(1)-102(a)(4) are arranged in a first configuration in the network 100 as "spine" switch devices, and the switch devices 102(b)(1)-102(b)(4) are arranged in a second configuration in the network as "leaf" switch devices. Spine switch 102(a)(1) is referred to hereinafter as "spine switch 1" or "spine 1," spine switch 102(a)(2) is referred to hereinafter as "spine switch 2" or "spine 2," and so on. Likewise, leaf switch 102(b)(1) is referred to hereinafter as "leaf switch 1" or "leaf 1," leaf switch 102(b)(2) is referred to hereinafter as "leaf switch 2" or "leaf 2," and so on.

In one example, as shown in FIG. 1, the spine switch devices 102(a)(1)-102(a)(4) may be arranged in the network 100 such that every spine switch device is directly connected to every leaf switch device but not directly connected to other spine switch devices. Likewise, the leaf switch devices 102(b)(1)-102(b)(4) may be arranged in the network 100 such that every leaf switch device is directly connected to every spine switch device but not directly connected to other leaf switch devices. Thus, the spine switch devices may be fully-meshed with every leaf switch device. This arrangement, however, is only an example, and the leaf devices and spine devices may be arranged in other configurations.

The designation of the switch devices 102(a)(1)-102(a)(4) as spine switch devices and of the switch devices 102(b)(1)-102(b)(4) as leaf switch devices indicates the device configuration within the network 100. All of the switch devices may be the same switch device type (e.g., Open Systems Interconnection (OSI) model layer 2 or layer 3 switch devices, which may be referred to hereinafter as "layer 2 switch devices" or "layer 3 switch devices").

FIG. 1 also shows a plurality of server devices ("servers") at reference numerals 104(1)-104(5). The server devices 104(1)-104(5) are directly connected to corresponding leaf switch devices, and the leaf switch devices may manage communications of the one or more server devices. Server device 104(1) is referred to hereinafter as "server device 1" or "server 1," server device 104(2) is referred to hereinafter as "server device 2" or "server 2," and so on. The server devices 104(1)-104(5) are physical devices that are configured to host one or more virtual machines shown at reference numerals 106(1)-106(4). The virtual machines 106(1)-106(4) may be hosted on software or hardware components of the server devices 104(1)-104(5). Virtual machine 106(1) is referred to hereinafter as "virtual machine 1" or "VM 1," virtual machine 106(2) is referred to hereinafter as "virtual machine 2" or "VM 2," and so on.

The virtual machines 106(1)-106(4) may be assigned and reassigned to be hosted by different servers in the network. For example, virtual machine 2 may initially be hosted by server 1 and later may be reassigned to be hosted by server 2.

Likewise virtual machine 3 may initially be assigned to be hosted by server 2 and may later be reassigned to be hosted by server 4. The assignment and migration of virtual machines in the network 100 to the server devices may be performed by a controller device (not shown in FIG. 1) and may depend, for example, on network conditions (e.g., bandwidth, processing capacity, etc. of the servers) or established network policies. Thus, when the virtual machines 106(1)-106(4) are reassigned to new servers, the virtual machines are said to "move" within the network 100.

The servers 104(1)-104(5) and the virtual machines 106(1)-106(4) are configured to exchange communications with each other within the network 100. For example, when a source virtual machine exchanges communications with a destination virtual machine, the physical server that hosts the source virtual machine sends traffic (e.g., data packets) to the server that hosts the destination virtual machine via one or more of the leaf switches and spine switches. In one example, a leaf switch will route data packets (e.g., layer 3 data packets) from a connected server to an appropriate spine switch and ultimately to the destination server. The leaf switch may route these data packets regardless of whether or not the destination server belongs to a same subnet or virtual local area network (VLAN) as the source of the packets. Thus, in order to ensure the reliable transmission of packets between the virtual machines 106(1)-106(4), it is important for the leaf switches 102(b)(1)-102(b)(4) to know which servers are hosting which virtual machines at any given point in time. Techniques for providing this information to the leaf switches 102(b)(1)-102(b)(4) are described herein.

Each of the leaf switches 102(b)(1)-102(b)(4) may be configured to manage communications with more than one server. For example, as shown in FIG. 1, leaf 1 may be configured to manage communications of server 1 and server 2 (and the virtual machines hosted by server 1 and server 2), leaf 3 may be configured to manage communications of server 3, server 4 and server 5 (and the virtual machines hosted by server 3, server 4 and server 5) and leaf 4 may be configured to manage communications of server 4 and server 5 (and the virtual machines hosted by server 4 and server 5).

Additionally, some of the leaf switches may be paired with other leaf switches to form a virtual port channel (vPC) switch device pair. In general, vPC pairing is a multi-chassis Ethernet Channel ("EtherChannel") solution that allows a server to connect to multiple physical switches via a traditional EtherChannel protocol (e.g., Link Aggregation Control Protocol (LACP)). When one leaf switch is paired with another leaf switch as a vPC pair, the vPC pairing mimics a single logical node that is presented to a server (e.g., between the two leaf switches). The logical node is "connected" to one or more servers, and thus from the perspective of the server, the server is connected to only one leaf switch. In other words, when a server is "connected" to a vPC port, the server believes that a single switch is responsible for managing its communications, when in actuality each switch in the vPC pair is responsible for managing these communications.

FIG. 1 shows three vPC logical nodes: vPC1 at reference numeral 108(1), vPC2 at reference numeral 108(2) and vPC3 at reference numeral 108(3). Server 2 is "connected" to vPC1, and thus from the perspective of server 2, it is connected to only one switch device. In actuality, vPC1 corresponds to a vPC pairing between leaf 1 and leaf 2, and thus, both leaf 1 and leaf 2 are connected to server 2. Accordingly, leaf 1 and leaf 2 can each manage communications of server 2 (and the virtual machines hosted by server 2). Likewise, server 4 is "connected" to vPC2, which corresponds to a vPC pairing between leaf 3 and leaf 4, and server 5 is "connected" to vPC3, which also corresponds to a vPC pairing between leaf 3 and leaf 4. As a result, server 4 and server 5 each believe that they are connected to only one switch device. In actuality, leaf 3 and leaf 4 are each configured to manage communications originating from both server 4 and server 5 (and the virtual machines hosted by server 4 and server 5).

As stated above, when one or more of the virtual machines 106(1)-106(4) move in the network 100, the leaf switches 102(b)(1)-102(b)(4) must be made aware of the movement. That is, the leaf switches 102(b)(1)-102(b)(4) must be provided with up-to-date knowledge of which servers host which particular virtual machines. Traditionally, the leaf switches 102(b)(1)-102(b)(4) are informed of virtual machine movement through a route update (e.g., a Border Gateway Protocol (BGP) route update) advertised by a leaf switch. For example, when a virtual machine moves from a first server to a second server, the leaf switch that manages communications of the second server broadcasts or "advertises" to all of the other leaf switches (via a route reflector, e.g., the spine switch 102(a)(1)) the host route associated with the virtual machine. The leaf switch that manages communications of the first server receives this host route and thus determines that it no longer manages communications associated with the virtual machine. As a result, the leaf switch that manages communications of the first server drops its association with the first virtual machine and withdraws its previously advertised host route.

This traditional method for informing leaf switches of virtual machine movement works well for servers connected to the leaf switches through physical ports. However, when one or more servers are connected to the leaf switches via vPC ports, the traditional method is problematic. For example, in FIG. 1, virtual machine 2 is originally hosted by server 1 and later moves (e.g., is "reassigned") to be hosted by server 2. Server 1 is connected to leaf 1 via a physical port, and server 2 is connected to both leaf 1 and leaf 2 via the virtual port vPC1. Thus, after virtual machine 2 moves to server 2, leaf 2 advertises the host route information to leaf 1, leaf 3 and leaf 4. Under the traditional methods described above, leaf 1 would drop its association with virtual machine 2 upon receiving the advertisement from leaf 2. However, leaf 1 is part of the vPC pair with leaf 2, and thus, leaf 1 still manages communications of virtual machine 2. Thus, in this example, it is not desirable for leaf 1 to drop its association with virtual machine 2.

The techniques presented herein alleviate these problems by allowing the leaf switches to send enhanced advertisements to other leaf switches upon virtual machine movement to prevent a vPC paired leaf switch from dropping its association with a virtual machine. This enhanced advertisement carried in BGP route updates is conceptually called a "VM movement advertisement" message and is shown at reference numerals 110(1)-110(3) in FIG. 1.

Figure 2:
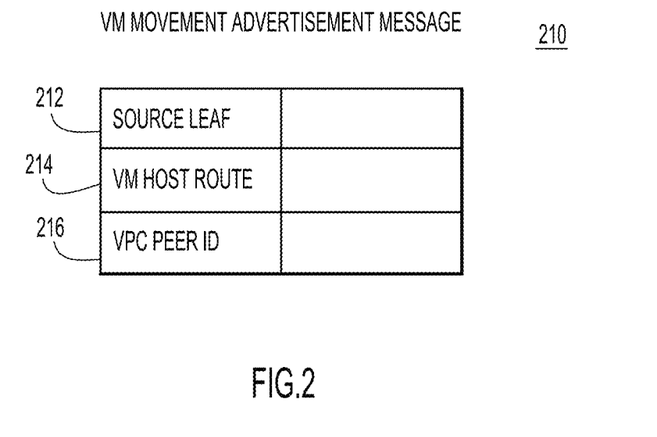
FIG. 2 shows an example of a virtual machine movement advertisement message that is used to inform the switch devices of virtual machine movements.

Reference is now made to FIG. 2. Reference numeral 210 in FIG. 2 shows information that is contained in the VM movement advertisement message that is sent by a leaf switch device. The information 210 in FIG. 2 shows the information contained in the VM movement advertisement message and does not include details of encoding the information into the message. The information 210 comprises a source leaf field 212 (e.g., the next hop associated with a virtual machine) that identifies the leaf switch device that in turn manages the server, that hosts a virtual machine. The information 210 also comprises a VM host route field 214 that identifies the particular virtual machine and a vPC peer ID field 216 that identifies a vPC peer associated with the source leaf (if there is one). The vPC peer ID field 216 is blank when there is no vPC peer associated with the source leaf. A leaf switch will advertise the VM movement advertisement message with the information 210 to the other leaf switches in the network. Upon receiving the VM movement advertisement message, the other leaf switches will determine whether or not to drop its association with the virtual machine identified in the message. Thus, the techniques presented herein provide a foolproof mechanism for switch devices to determine and manage virtual machine movements.

Referring back to FIG. 1, when virtual machine 2 moves from server 1 to server 2 (depicted at reference A in FIG. 1), leaf 2 (which manages server 2) sends the VM movement advertisement message 110(1) to leaf 1, leaf 3 and leaf 4 (via, e.g., the spine switch 102(a)(1)). Upon receiving the VM movement advertisement message 110(1), each of the other leaf switches evaluates the information 210 to determine the particular virtual machine (i.e., virtual machine 2) with which the message 110(1) is associated (e.g., by identifying an Internet Protocol (IP) address of virtual machine 2). The leaf switches then check their own local routing tables to determine whether or not they have a virtual machine host route for virtual machine 2. If a leaf switch does not have a host route for virtual machine 2 in its own local routing table or if it has a host route for virtual machine 2 but the nexthop of the host route is not one of its local server facing physical or vPC ports, the leaf switch does not associate with virtual machine 2 (i.e., the leaf switch will determine that it does not manage communications of a server that hosts the virtual machine) and therefore do nothing (i.e., the leaf switch will not withdraw host route for the virtual machine 2). It should be appreciated that the leaf switches are configured to store host route information associated with virtual machines, even if they are not associated with a particular leaf switch.

If a leaf switch does have a host route for virtual machine 2 (e.g., leaf 1), it will evaluate its local routing table and the information 210 in the message 110(1) for two items of information. First, leaf 1 will evaluate whether its local routing table indicates that the next hop of virtual machine 2 points to a local server facing physical port. If the local routing table indicates a local server facing physical port as the nexthop, leaf 1 will drop its association with virtual machine 2 and withdraws its previously advertised host route. The indication of a local server facing physical port indicates that virtual machine 2 has moved to a different server, and thus only the current switch that manages the server to which virtual machine 2 has moved is configured to manage communications of the server (and the virtual machines). Accordingly, the previous switch drops its association with the virtual machine.

Second, the local routing table should indicate a local server facing vPC port as the nexthop and therefore leaf 1 will evaluate the vPC peer ID field in the message 110(1) to determine whether or not leaf 1 belongs to a vPC pair with leaf 2. That is, leaf 1 will evaluate the vPC peer ID field to determine whether or not its identifier is listed as a vPC pair. If leaf 1 is not listed as a vPC pair, leaf 1 will drop its association with virtual machine 2 and will withdraw its previously advertised host route. Otherwise (i.e., leaf 1 is listed as a vPC peer), leaf 1 will not drop its association with virtual machine 2 and will not withdraw its previously advertised host route. This indicates that virtual machine 2 has moved to a server hosted by a switch that has a vPC pairing with a switch that manages communications of a server on which the virtual machine was previously hosted. Thus, in summary, upon receiving the VM movement advertisement message 110(1), leaf 1 will drop its association with virtual machine 2 unless the nexthop of the host route in the local routing table does not indicate a physical port and leaf 1 is identified as a vPC peer with leaf 2.

Taking the example above, when virtual machine 2 moves to server 2, leaf 3 evaluates the message 110(1) advertised by leaf 2 and does not associate with virtual machine 2 (since the host route for virtual machine 2 in its own local routing table does not have one of its local server facing ports as the nexthop) Likewise, leaf 4 also does not associate with virtual machine 2 since the host route for virtual machine 2 in its own local routing table also does not have one of its local server facing ports as the nexthop. Leaf 1, on the other hand, does have a host route in its local routing table with a local physical port as the nexthop since it manages communications of server 1, which previously hosted virtual machine 2. Therefore, leaf 1 will temporarily drop its association with virtual machine 2 and re-advertise later when the local host route is re-installed, either due to the vPC synchronization or an end host discovery scheme.

Still referring to FIG. 1, in another example, virtual machine 3 moves from server 2 to server 4, as shown at reference B. After virtual machine 3 moves to server 4, leaf 3, which manages communications of server 4, sends the VM movement advertisement message 110(2) to leaf 1, leaf 2 and leaf 4 (via a spine switch, as stated above). Upon receiving the message 110(2), leaf 4 does not associate with virtual machine 3 yet since the host route for virtual machine 3 in its own local routing table and does not have one of its local server facing ports as the nexthop. Leaf 1 and leaf 2, on the other hand, do have a host route for virtual machine 3 in its local routing table, since they manage communications of server 2, which previously hosted virtual machine 3. Since the nexthops of the routes in leaf1 and leaf5 are both vPC ports, they further evaluate the message 110(2). The vPC peer ID field, however, does not list leaf 1 or leaf 2 as a vPC pair with leaf 3, and thus, they drop its association with virtual machine 3 and withdraw their previously advertised host routes.

In another example, virtual machine 4 moves from server 4 to server 5, as shown at reference C in FIG. 1. After the virtual machine 4 moves to server 5, leaf 4, which manages communications over server 5, sends the VM movement advertisement message 110(3) to leaf 1, leaf 2 and leaf 3 (via a spine switch). Upon receiving the message 110(3), leaf 1 does not associate with virtual machine 4 since the host route for virtual machine 4 in its own local routing table does not have one of its local server facing ports as the nexthop. Likewise, leaf 2 does not associate with virtual machine 4 since the host route for virtual machine 4 in its local routing table also does not have one of its local server facing ports as the nexthop. Leaf 3 does have a host route for virtual machine 4 (since it manages server 3, which previously hosted virtual machine 4), with a local server facing vPC port, vPC2, as the nexthop. Thus, leaf 3 further evaluates the message 110(3). The vPC peer ID field also lists leaf 3 as a vPC peer with leaf 4, and thus, leaf 3 does not drop its association with virtual machine 4.

Thus, as demonstrated by the above examples, the virtual movement advertisement message that is exchanged between leaf switches enables the leaf switches to determine movement of virtual machines in the network 100. There may be situations, however, when a leaf switch changes its vPC port membership while a virtual machine is moving in the network. For example, a leaf switch may be paired with another leaf switch to form a new vPC pair (e.g., a leaf switch "bundles" with another leaf switch as a vPC pair) or a leaf switch may remove its association from a vPC pair (e.g., a leaf switch "unbundles" with another leaf switch).

In one example, suppose vPC1 initially has only one member port, connecting leaf 2 to server 2 (i.e., there is only one leaf switch belonging to the vPC1 pair). When virtual machine 2 moves from server 1 to server 2, the message 110(1) advertised by leaf 2 will have a blank entry for the vPC peer ID, since there is no peer leaf switch for leaf 2. If leaf 1 joins vPC1 ("bundles" with leaf 2) before leaf 1 receives the message 110(1) from leaf 2, leaf 1 will drop its association with virtual machine 2 since it will not have been listed as a vPC peer with leaf 2 (as described above). To avoid this situation, an address resolution protocol (ARP) refresh mechanism can be used such that leaf 1 sends an ARP request message to virtual machine 2 with a low refresh time on vPC1, and virtual machine 2 responds with an ARP response message to prevent leaf 1 from dropping its association with virtual machine 2.

By default, an ARP request message will be sent out periodically (e.g., every 300 seconds) to make sure the ARP entries are still valid. By setting a low refresh time, an ARP request will be sent more frequently in order to detect if the entries are valid or not. In this case, leaf 1 can afford to refrain from dropping until the entry is validated.

In another example, suppose vPC3 initially has two member ports (e.g., associated with leaf 3 and leaf 4). When virtual machine 4 moves from server 4 to server 5, the message 110(3) advertised by leaf 4 will list leaf 3 as a vPC peer in the vPC peer ID field. If leaf 3 later leaves the vPC3 pairing ("unbundles" from leaf 4) before it receives message 110(3), leaf 3 will not drop its association with virtual machine 4, since the message 110(3) will list leaf 3 as the vPC peer. To avoid this situation, leaf 4 may re-advertise or re-broadcast the same host route to the leaf switches with an updated vPC peer ID field. That is, leaf 4 will send a new VM movement advertisement message to all of the leaf switches in the network whenever another leaf device unbundles from a vPC pair to which leaf 4 belongs. This re-advertisement will cause leaf 3 to drop its association with virtual machine 4 since leaf 3 will no longer be listed in the vPC peer ID field in the re-advertised message.

Figure 3:
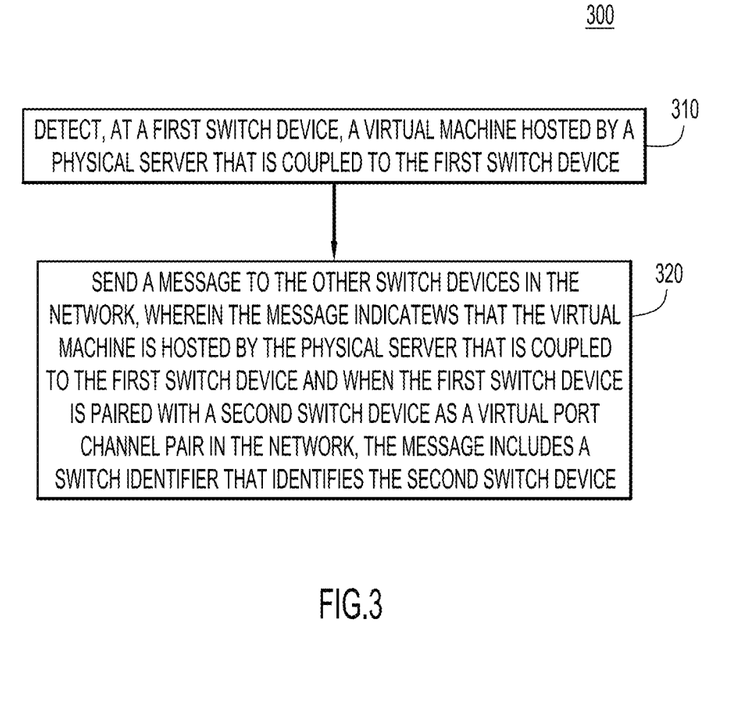
FIG. 3 shows an example flow chart depicting operations of a switch device sending the virtual machine movement advertisement message to other switch devices.

Reference is now made to FIG. 3. FIG. 3 shows an example flow chart 300 depicting operations of a leaf switch sending the VM movement advertisement message to other leaf switches. At operation 310, a first switch device (i.e., a leaf switch) detects a virtual machine that is hosted by a physical server that is coupled to the first switch device. At operation 320, the first switch device sends a message to other switch devices in the network. The message indicates that the virtual machine is hosted by the physical server that is coupled to the first switch device. When the first switch device is paired with a second switch device as a virtual port channel in the network, the message includes a switch identifier that identifies the second switch device.

Figure 4:
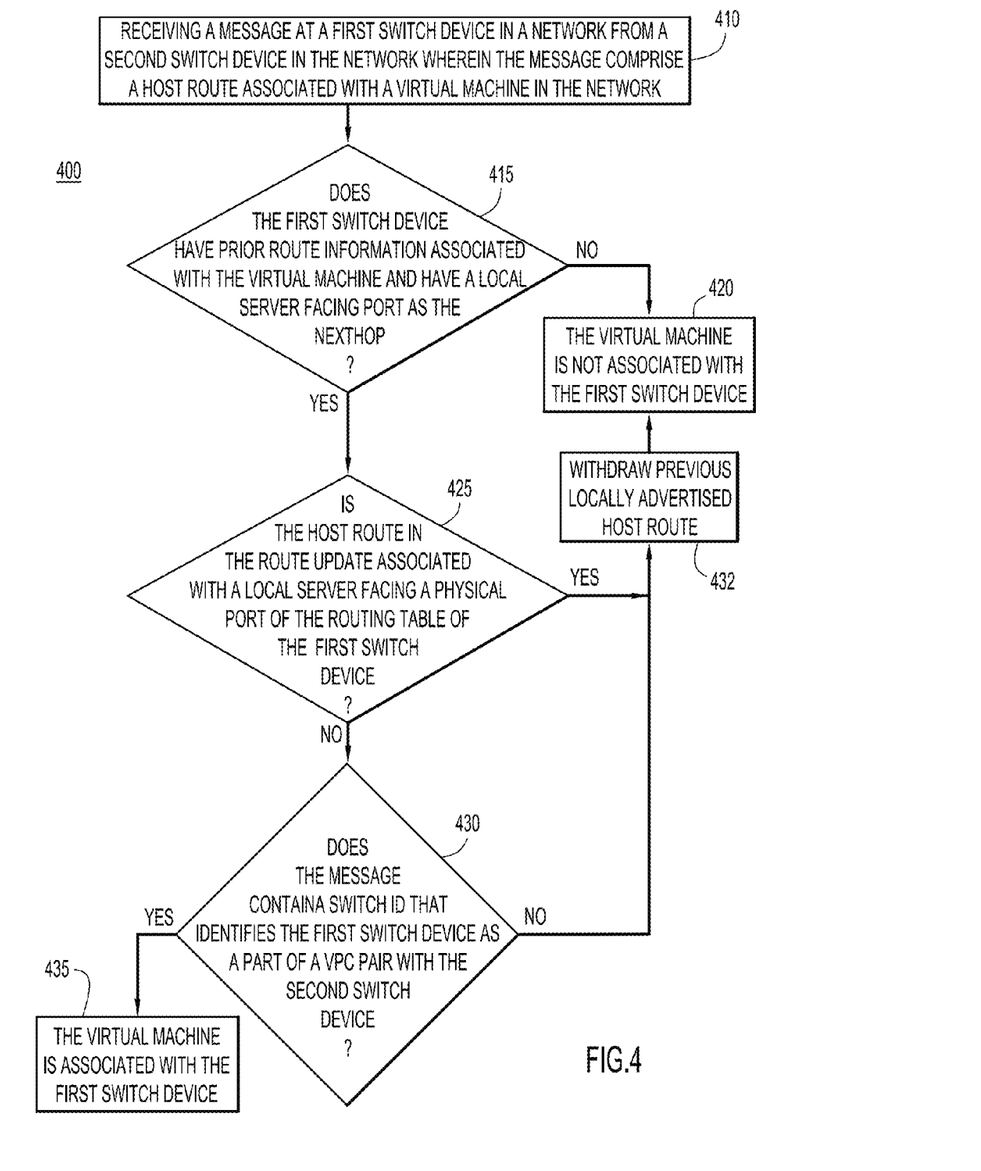
FIG. 4 shows an example flow chart depicting operations of a switch device receiving the virtual machine movement advertisement message from another switch device.

Reference is now made to FIG. 4. FIG. 4 shows an example flow chart 400 depicting operations of a leaf switch receiving the VM movement advertisement message from another leaf switch. At operation 410, a message is received at a first switch device (i.e., a receiving leaf switch) in a network from a second switch device (i.e., a source leaf switch) in the network. The message comprises a route update associated with a virtual machine in the network. At operation 415, the first switch device determines whether it has prior route information associated with the virtual machine and has a local server facing port as the nexthop. If not, at operation 420, the first switch device determines that the virtual machine is not associated with the first switch device. If the first switch device does have prior route information associated with the virtual machine and have a local server facing port as the nexthop, at operation 425, the first switch device determines whether the host route in the route update is associated with a local server facing the physical port of the first switch device. In other words, the first switch device will evaluate its local routing table to determine whether the next hop of the virtual machine route points to a physical port. If so, the first switch device withdraws its previous locally advertised host routes at operation 432 and reverts to operation 420 to determine that the virtual machine is not associated with the first switch device. If the first switch device determines that the host route is not associated with a physical port (i.e., it is associated with a vPC port), the first switch device, at operation 430, determines whether the message contains a switch identifier that identifies the first switch device as a part of a vPC pair with the second switch device in the network. If the first switch device is not part of a vPC pair with the second switch device, the first switch device withdraws its previous locally advertised host routes at operation 432 and reverts to operation 420 to determine that the virtual machine is not associated with it. If the first switch device is part of a vPC pair, the first switch device, at operation 435, determines that the virtual machine is associated with the first switch device.

Figure 5:
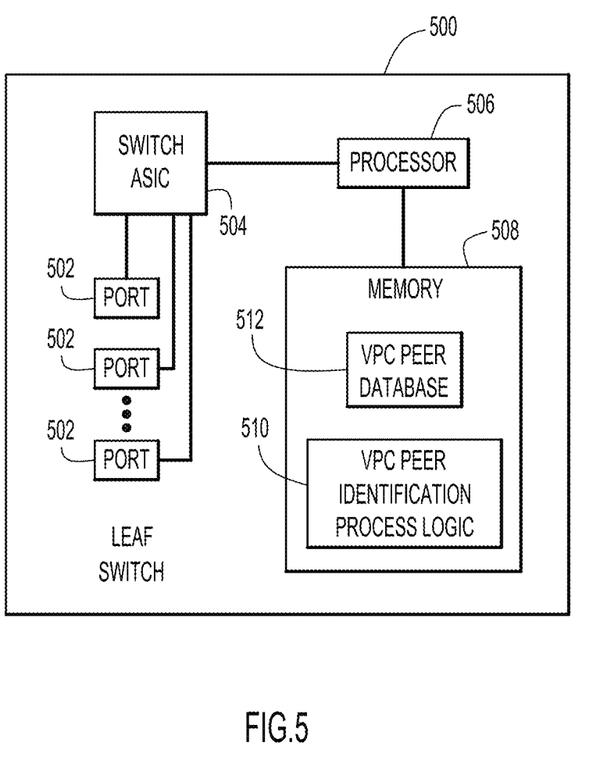
FIG. 5 shows an example block diagram of the switch device that is configured to send and receive the virtual machine movement advertisement message to inform other switch devices of virtual machine movement in the network.

Reference is now made to FIG. 5. FIG. 5 shows an example block diagram 500 of a switch device that is configured to send and receive the VM movement advertisement message. The switch device 500 may be any of the switches depicted in FIG. 1 (e.g., any of the leaf switches 102(b)(1)-102(b)(4). The switch device 500 comprises, among other components, a plurality of port units 502, a switch application specific integrated circuit (ASIC) 504, a processor 506 and a memory 508. The ports 502 receive communications (e.g., frames) from devices in the network 100 and are configured to send communications to devices the network 100. For example, the ports 502 send and receive the VM movement advertisement messages depicted in FIG. 1 and send and receive frames and/or packets from the servers 104(1)-104(5) and other switch devices in the network 100. The ports 502 are coupled to the switch ASIC 504. The switch ASIC 504 receives instructions from the processor 506 and forwards frames and/or packets to an appropriate one of the port units 502 for transmission to a destination network device in the network 100. The switch ASIC 504 is coupled to the processor 506. The processor 506 is, for example, a microprocessor or microcontroller that is configured to execute program logic instructions (i.e., software) for carrying out various operations and tasks of the switch device 500, as described above. For example, the processor 506 is configured to execute vPC peer identification process logic 510 to inform other switch devices of virtual machine movement in the network by generating and sending a VM movement advertisement message, according to the techniques described above. The vPC peer identification process logic 510 also instructs the processor to update a vPC peer database 512 whenever another switch device joins the switch device 500 as a vPC pair (i.e., bundles with the switch device 500) and whenever another switch devices disassociates from the switch device 500 as a vPC pair (i.e., unbundles with the switch device 500). The functions of the processor 506 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 508 may comprise read only memory (ROM), random access memory (RAM), magnetic disk storage media devices, optical storage media devices, flash memory devices, electrical, optical, or other physical/tangible (non-transitory) memory storage devices. The memory 508 stores software instructions for the vPC peer identification process logic 510. The memory 508 also stores the vPC peer database 512 that, as described above, stores the vPC pairings associated with the switch device 500. Additionally, the memory 508 may also store a database of routing information associated with virtual machines (not shown in FIG. 5). Thus, in general, the memory 508 may comprise one or more computer readable storage media (e.g., a memory storage device) encoded with software comprising computer executable instructions and when the software is executed (e.g., by the processor 506) it is operable to perform the operations described for the vPC peer identification process logic 210.

The vPC peer identification process logic 510 may take any of a variety of forms, so as to be encoded in one or more tangible computer readable memory media or storage device for execution, such as fixed logic or programmable logic (e.g., software/computer instructions executed by a processor), and the processor 506 may be an ASIC that comprises fixed digital logic, or a combination thereof.

For example, the processor 506 may be embodied by digital logic gates in a fixed or programmable digital logic integrated circuit, which digital logic gates are configured to perform the vPC peer identification process logic 510. In general, the vPC peer identification process logic 510 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by the leaf switches may be performed by one or more computer or machine readable storage media (non-transitory) or device executed by a processor and comprising software, hardware or a combination of software and hardware to perform the techniques described herein.

In summary, a method is provided comprising: at a first switch device in a network, detecting a virtual machine hosted by a physical server that is coupled to the first switch device; and sending a message to other switch devices in the network, wherein the message indicates that the virtual machine is hosted by the physical server that is coupled to the first switch device and when the first switch device is paired with a second switch device as a virtual port channel pair in the network, the message includes a switch identifier that identifies the second switch device.

In addition, a method is provided comprising: at a first switch device in a network, receiving a message from a second switch device in the network, wherein the message comprises a route update associated with a virtual machine in the network; evaluating a routing table of the first switch device to determine whether the host route in the route update received from the second switch device is associated with a local server facing a physical port of the first switch device; examining the message to determine whether the message contains a switch identifier that identifies the first switch device as part of a virtual port channel pair with the second switch device in the network; and determining that the virtual machine is not associated with the first switch device based on the evaluating and the examining.

Furthermore, an apparatus is provided comprising: one or more port units; a memory unit; and a processor coupled to the memory units and the port units and configured to: detect a virtual machine hosted by a physical server; send a message to switch devices in the network, wherein the message indicates that the virtual machine is hosted by the physical server and when the apparatus is paired with a corresponding switch device as a virtual port channel pair in the network, the message includes a switch identifier that identifies the corresponding switch device.

Additionally, an apparatus is provided comprising: a plurality of port units; a memory unit; and a processor coupled to the port units and the memory unit and configured to: receive a message from a switch device in the network, wherein the message comprises a route update associated with a virtual machine in the network; evaluate a routing table to determine whether the host route in the route update received from the switch device is associated with a local server facing a physical port; examine the message to determine whether the message contains a switch identifier that identifies the apparatus as part of a virtual port channel pair with the switch device in the network; and determine that the virtual machine is not associated with the apparatus.

In addition, a computer-readable storage media is provided that is encoded with software comprising computer executable instructions and when the software is executed operable to: detect a virtual machine hosted by a physical server coupled to a first switch device; and sending a message to other switch devices in the network, wherein the message indicates that the virtual machine is hosted by the physical server that is coupled to the first switch device and when the first switch device is paired with a second switch device as a virtual port channel pair in the network, the message includes a switch identifier that identifies the second switch device.

Furthermore, a computer-readable storage media is provided that is encoded with software comprising computer executable instructions and when the software is executed operable to: receive a message from a second switch device in a network at a receiving switch device in the network, wherein the message comprises a route update associated with a virtual machine in the network; evaluate a routing table of the receiving switch device to determine whether the host route in the route update received from the second switch device is associated with a local server facing a physical port of the receiving switch device; examine the message to determine whether the message contains a switch identifier that identifies the receiving switch device as part of a virtual port channel pair with the second switch device in the network; and determine that the virtual machine is not associated with the receiving switch device.

The above description is intended by way of example only. Various modifications and structural changes may be made therein without departing from the scope of the concepts described herein and within the scope and range of equivalents of the claims.

What is claimed is:

1. A method comprising:
   at a first switch device in a network, detecting a virtual machine hosted by a physical server that is coupled to the first switch device; and
   sending a message from the first switch device to a plurality of other switch devices in the network, wherein the message indicates that the virtual machine is hosted by the physical server that is coupled to the first switch device, and when the first switch device is paired with a second switch device as a virtual port channel pair in the network the message from the first switch device to the plurality of other switch devices includes a switch identifier that identifies the second switch device, wherein the plurality of other switch devices includes the second switch device and at least one additional switch device that is not associated with the virtual port channel pair.

2. The method of claim 1, further comprising receiving a route update of the virtual machine, and wherein detecting comprises detecting the virtual machine based on an inspection of incoming packets.

3. The method of claim 2, wherein sending comprises sending the message comprising the route update of the virtual machine to the other switch devices to enable the other switch devices to evaluate the route update and determine that the virtual machine is managed by the first switch device.

4. The method of claim 1, wherein sending comprises sending the message with the switch identifier such that upon receiving the message, the second switch device evaluates the message with the switch identifier to determine that the virtual machine is also coupled to the second switch device.

5. The method of claim 1, further comprising sending a new message to the other switch devices in response to an unbundling of the second switch device from the first switch device, wherein the new message is a rebroadcast of the message without the switch identifier identifying the second switch device as a virtual port channel pair with the first switch device.

6. An apparatus comprising:
one or more network ports;
a memory; and
a processor coupled to the memory and the network ports and configured to:
detect a virtual machine hosted by a physical server; and
send a message to a plurality of switch devices in the network, wherein the message indicates that the virtual machine is hosted by the physical server, and when the apparatus is paired with a corresponding switch device as a virtual port channel pair in the network the message to the plurality of switch devices includes a switch identifier that identifies the corresponding switch device, wherein the plurality of switch devices includes the corresponding switch device and at least one additional switch device that is not associated with the virtual port channel pair.

7. The apparatus of claim 6, wherein the processor is further configured to receive a route update of the virtual machine and to detect the virtual machine based on an inspection of incoming packets.

8. The apparatus of claim 7, wherein the processor is further configured to send the message comprising the route update of the virtual machine to the switch devices to enable the switch devices to evaluate the route update and determine that the virtual machine is managed by the apparatus.

9. The apparatus of claim 6, wherein the processor is further configured to send the message with the switch identifier such that upon receiving the message, the corresponding switch device evaluates the message with the switch identifier to determine that the virtual machine is also coupled to the corresponding switch device.

10. The apparatus of claim 6, wherein the processor is further configured to send a new message to the other switch devices in response to an unbundling of the corresponding switch device from the apparatus, wherein the new message is a rebroadcast of the message without the switch identifier identifying the corresponding switch device as a virtual port channel pair with the apparatus.

11. A non-transitory computer-readable storage media encoded with software comprising computer executable instructions and when the software is executed operable to:
detect a virtual machine hosted by a physical server coupled to a first switch device; and
send a message from the first switch device to a plurality of other switch devices in the network, wherein the message indicates that the virtual machine is hosted by the physical server that is coupled to the first switch device and when the first switch device is paired with a second switch device as a virtual port channel pair in the network, the message from the first switch device to the plurality of other switch devices includes a switch identifier that identifies the second switch device,
wherein the plurality of other switch devices includes the second switch device and at least one additional switch device that is not associated with the virtual port channel pair.

12. The computer-readable storage media of claim 11, further comprising instructions operable to receive a route update of the virtual machine and to detect the virtual machine based on an inspection of incoming packets.

13. The computer-readable storage media of claim 12 wherein the instructions operable to send comprise instructions operable to send the message comprising the route update of the virtual machine to the other switch devices to enable the other switch devices to evaluate the route update and determine that the virtual machine is managed by the first switch device.

14. The computer-readable storage media of claim 11, further comprising instructions operable to send the message with the switch identifier such that upon receiving the message, the second switch device evaluates the message with the switch identifier to determine that the virtual machine is also coupled to the second switch device.

15. The computer-readable storage media of claim 11, further comprising instructions operable to send a new message to the other switch devices in response to an unbundling of the second switch device from the first switch device, wherein the new message is a rebroadcast of the message without the switch identifier identifying the second switch device as a virtual port channel pair with the first switch device.

16. A system comprising:
a network comprising a plurality of switch devices;
a first switch device among the plurality of switch devices to detect a virtual machine hosted by a physical server; and
a virtual port channel pair comprising the first switch device and a second switch device among the plurality of switch devices;
wherein the first switch device sends a message to the plurality of switch devices, the message indicating that the virtual machine is hosted by the physical server and further including a switch identifier that identifies the second switch device as belonging to the virtual port channel pair, and
wherein the plurality of switches includes the second switch device and at least one additional switch device that is not associated with the virtual port channel pair.

17. The system of claim 16, wherein the first switch device receives a route update of the virtual machine, and wherein the first switch device detects the virtual machine based on an inspection of incoming packets.

18. The system of claim 17, wherein the first switch device sends the message comprising the route update of the virtual machine to the other switch devices to enable the other switch devices to evaluate the route update and determine that the virtual machine is managed by the first switch device.

19. The system of claim 16, wherein the first switch device sends the message with the switch identifier such that upon receiving the message, the second switch device evaluates the message with the switch identifier to determine that the virtual machine is also coupled to the second switch device.

20. The system of claim 16, wherein the first switch device further sends a new message to the other switch devices in response to an unbundling of the second switch device from the first switch device, wherein the new message is a rebroadcast of the message without the switch identifier identifying the second switch device as a virtual port channel pair with the first switch device.

* * * * *